US011937542B2

(12) United States Patent
Palermo et al.

(10) Patent No.: US 11,937,542 B2
(45) Date of Patent: Mar. 26, 2024

(54) STRING TRIMMER WITH POLE BREAK

(71) Applicant: Black & Decker, Inc., New Britain, CT (US)

(72) Inventors: John Palermo, Baltimore, MD (US); Marina Rubanchenko, Bel Air, MD (US)

(73) Assignee: Black & Decker, Inc., New Britain, CT (US)

( * ) Notice: Subject to any disclaimer, the term of this patent is extended or adjusted under 35 U.S.C. 154(b) by 84 days.

(21) Appl. No.: 17/747,415

(22) Filed: May 18, 2022

(65) Prior Publication Data

US 2022/0272894 A1 Sep. 1, 2022

Related U.S. Application Data

(63) Continuation of application No. 16/673,043, filed on Nov. 4, 2019, now Pat. No. 11,369,057.

(51) Int. Cl.
*A01D 34/68* (2006.01)
*A01D 34/416* (2006.01)
*A01D 34/78* (2006.01)
*A01D 34/82* (2006.01)
*F16C 11/10* (2006.01)

(52) U.S. Cl.
CPC .......... *A01D 34/68* (2013.01); *A01D 34/416* (2013.01); *A01D 34/78* (2013.01); *A01D 34/824* (2013.01); *F16C 11/10* (2013.01)

(58) Field of Classification Search
CPC .............................. A01D 34/68; A01D 34/416
See application file for complete search history.

(56) References Cited

U.S. PATENT DOCUMENTS

| 4,122,601 A | * | 10/1978 | Katsuya | A01D 34/90 30/298.4 |
| 4,578,863 A | | 4/1986 | Laverick | |
| 4,829,675 A | * | 5/1989 | Beihoffer | A01D 34/822 403/311 |
| 5,261,162 A | * | 11/1993 | Siegler | A01G 3/053 30/223 |

(Continued)

FOREIGN PATENT DOCUMENTS

| CN | 204069756 U | 1/2015 |
| CN | 107756342 A | 3/2018 |

(Continued)

*Primary Examiner* — Sean M Michalski
(74) *Attorney, Agent, or Firm* — John Yun

(57) ABSTRACT

The invention is directed to an outdoor device, preferably a string trimmer, having a hinged pole for folding the string trimmer. The hinge has an easy to use lock that allows for repeated folding of the trimmer for easy transport and storage. The string trimmer has a battery at a rear end of the pole near the handle, and a motor at a front end on the cutting head. An electrical cable is run from the battery to the motor to provide power to the motor. The hinge provides a protective sheath around the cable to protect it from damage when the string trimmer is folded and the cable might otherwise be exposed. Additionally, the string trimmer includes a guard around the cutting head that contacts a battery housing to secure the string trimmer in a folded position.

14 Claims, 11 Drawing Sheets

(56) References Cited

U.S. PATENT DOCUMENTS

| | | | |
|---|---|---|---|
| 5,446,964 A * | 9/1995 | Woods | B25F 5/02 30/277.4 |
| 6,006,434 A * | 12/1999 | Templeton | A01D 34/90 30/296.1 |
| 6,014,812 A * | 1/2000 | Webster | A01D 34/416 30/276 |
| 6,301,788 B1 | 10/2001 | Webster | |
| 7,134,208 B2 | 11/2006 | Wilkinson et al. | |
| 7,484,300 B2 * | 2/2009 | King | B27B 17/0008 30/296.1 |
| 7,752,760 B2 * | 7/2010 | Baskar | A01G 3/0417 30/340 |
| 8,539,678 B2 | 9/2013 | Dahlberg et al. | |
| 9,379,596 B2 * | 6/2016 | Kraetzig | H02K 9/06 |
| 9,854,738 B2 | 1/2018 | Miller et al. | |
| 10,314,228 B2 * | 6/2019 | Ma | A01D 34/416 |
| 10,375,896 B2 | 8/2019 | Sheffer et al. | |
| 10,688,647 B2 * | 6/2020 | Ackerman | B25F 5/02 |
| 10,779,468 B2 * | 9/2020 | Ota | A01D 34/902 |
| 10,939,612 B2 * | 3/2021 | Lab | A01D 34/90 |
| 11,369,057 B2 * | 6/2022 | Palermo | A01D 34/416 |
| 2002/0042997 A1* | 4/2002 | Uhl | B27B 17/00 30/296.1 |
| 2006/0048397 A1* | 3/2006 | King | B25F 5/02 30/296.1 |
| 2009/0090094 A1 | 4/2009 | Million et al. | |
| 2011/0241457 A1 | 10/2011 | Müller et al. | |
| 2013/0075122 A1* | 3/2013 | Yamada | F16D 1/112 464/182 |
| 2017/0273239 A1* | 9/2017 | Ota | A01D 34/68 |
| 2018/0104809 A1 | 4/2018 | Dyer et al. | |
| 2018/0332766 A1 | 11/2018 | Ackerman et al. | |
| 2021/0127570 A1* | 5/2021 | Palermo | A01D 34/416 |
| 2022/0272894 A1* | 9/2022 | Palermo | A01D 34/78 |

FOREIGN PATENT DOCUMENTS

| | | |
|---|---|---|
| CN | 207415296 U | 5/2018 |
| CN | 108184408 A | 6/2018 |
| CN | 208210803 U | 12/2018 |
| JP | 2013247888 A | 12/2013 |
| WO | 2013014751 A1 | 1/2013 |

* cited by examiner

STRING TRIMMER WITH POLE BREAK

The present application is a continuation of U.S. patent application Ser. No. 16/673,043, filed Nov. 4, 2019, entitled "String Trimmer With Pole Break", which is hereby incorporated by reference in its entirety.

FIELD OF THE INVENTION

The present invention is directed to a string trimmer having a hinged pole allowing the tool to be folded for easy transport and storage.

BACKGROUND OF THE INVENTION

String trimmers are common outdoor tools that typically have a long pole with a cutting head on an end and a handle at the other. The cutting head includes a filament line or other cutting element that is rotated at high speed to cut vegetation. In the case of cordless string trimmers, removable batteries are usually provided in the handle with a motor located in the cutting head. To deliver power to the motor, an electrical cable is run from the battery through the pole to the motor.

Many string trimmers have a single integral pole which provides the cheapest and simplest tool. However, the length of the pole can make them unwieldy and increase shipping costs for manufacturers. To address this issue, some manufacturers use two separate poles that users must assemble before first use. Oftentimes these poles are designed to be assembled only once when first used and are not easily taken apart. The makes transport and storage difficult for the user, or requires him to go through the cumbersome process of disassembling the string trimmer.

BRIEF SUMMARY OF THE INVENTION

Therefore, there is a need for a string trimmer that is easy to fold for transport and storage. Furthermore, any electrical cable running through the pole, connecting the battery and the motor, must be protected against damage from repeated folding The present invention is directed to a poled string trimmer having a first end with cutting head and motor, and a second end having a handle with a battery housing for receiving a removable and rechargeable battery. The pole includes a rotatable hinge for allowing the string trimmer to be folded, and an electrical cable connecting the battery housing and the motor is run through the hinge. The hinge includes a hub with an opening, allowing the cable to be wired through an interior space of the hub. The pole and hinge therefore provide a protective covering for the electrical cable. The hub also reduces the chance that the electrical cable will be "pinched" and damaged by the pole halves.

An embodiment of the invention includes a latch that locks the hinge in a straight configuration. The latch is preferably an over-center latch, that includes a lever with an inset tab. The tab rotates with respect to the lever and engages a hook to prevent the lever from moving from the locked to the unlocked position. The tab provides a safety feature to prevent accidental release of the lever.

A further embodiment of the invention includes a guard on the cutting head. The guard's primary function is to shield user from flying debris launched by the cutting head. However, when a battery is inserted, the guard blocks the battery so that the string trimmer cannot be fully folded. When the battery is removed, the battery housing can move past the guard into the fully folded position. Additionally, the guard includes a contact surface that engages the battery housing to secure the string trimmer in the folded position.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
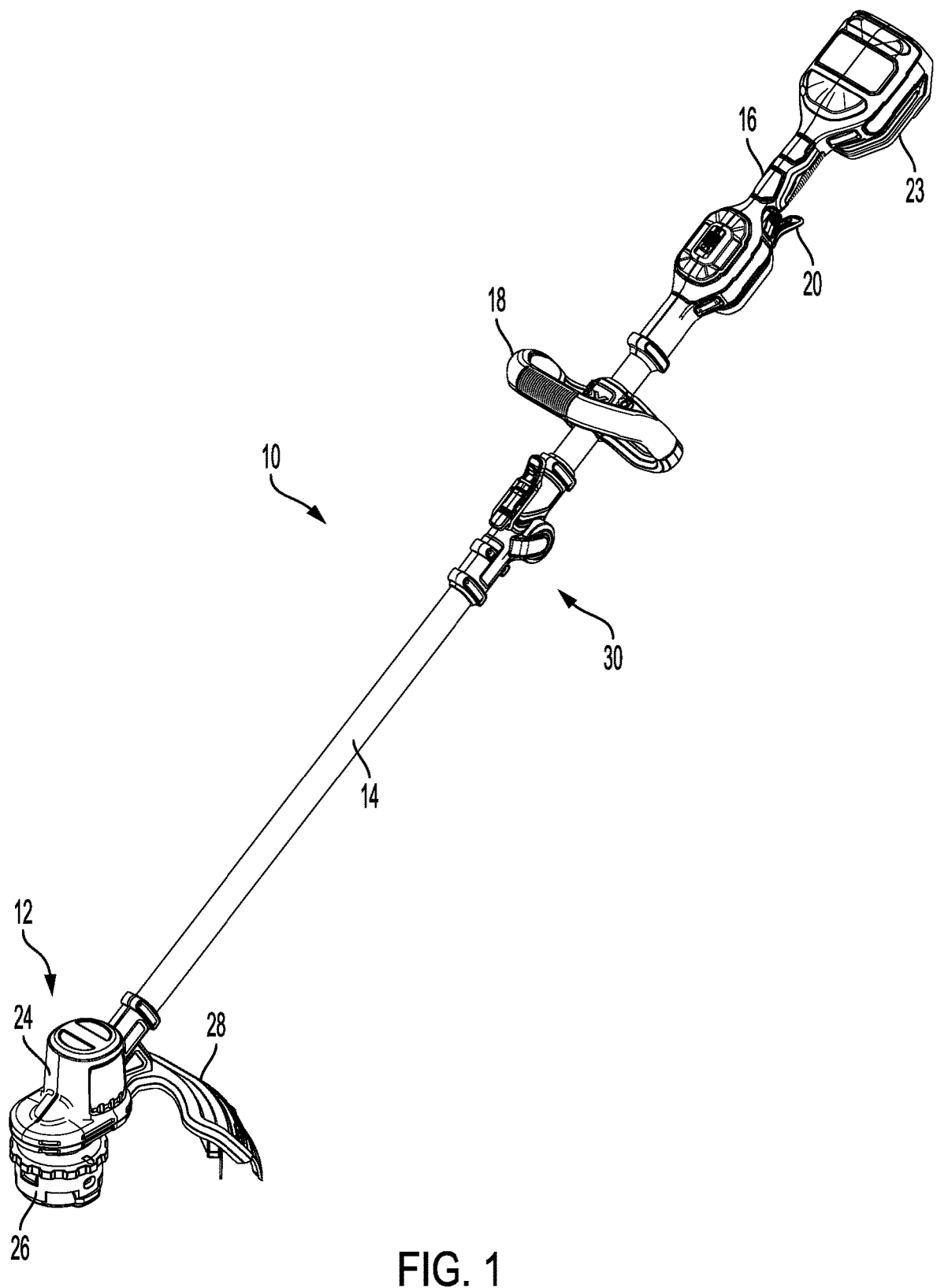
FIG. 1 is a perspective view of a string trimmer of the present invention.
Figure 2:
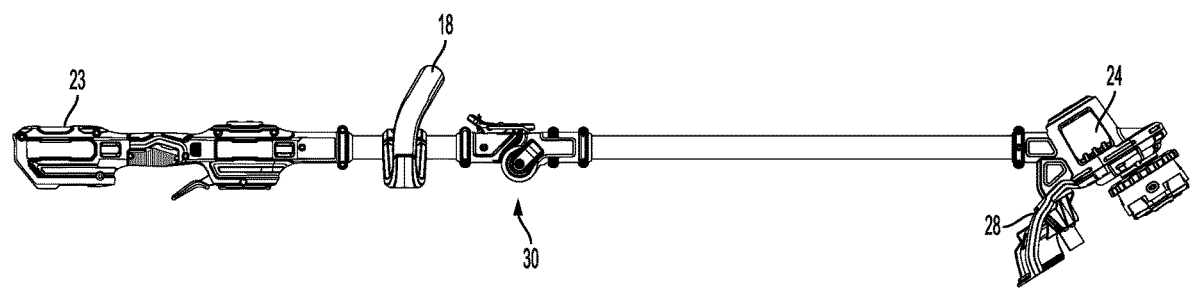
FIG. 2 is a side view of the string trimmer of FIG. 1.

FIG. 1 shows a string trimmer of the present invention. The string trimmer 10 includes a cutting head 12 at a first end of a pole 14. A second end of the pole 14 includes a main handle 16 with a power trigger 20. An auxiliary handle 18 is positioned forward of the main handle 16 to provide the user with greater control. A battery housing 23 is located at the rear of the pole and receives a battery 22 (see FIGS. 3 and 4). The battery 22 provides power to a motor in the cutting head and is removable and rechargeable. Although the embodiment shown in the figures shows a battery 22, any power source may be used and fall within the scope of the invention, including but not limited to electrical power through a cord or a gas engine.

The cutting head 12 has a motor housing 24 that encloses the motor. A spool housing 26 is operatively connected to the motor. The spool housing encloses a spool with cutting line wound thereon. The cutting line extends out of the spool housing, and as the motor rotates the spool housing 26, the cutting line is rotated to cut vegetation. A guard 28 extends rearwardly from the motor housing 24 to provide a protective shield for the user, blocking any debris that may be thrown by the cutting line.

Figure 3:
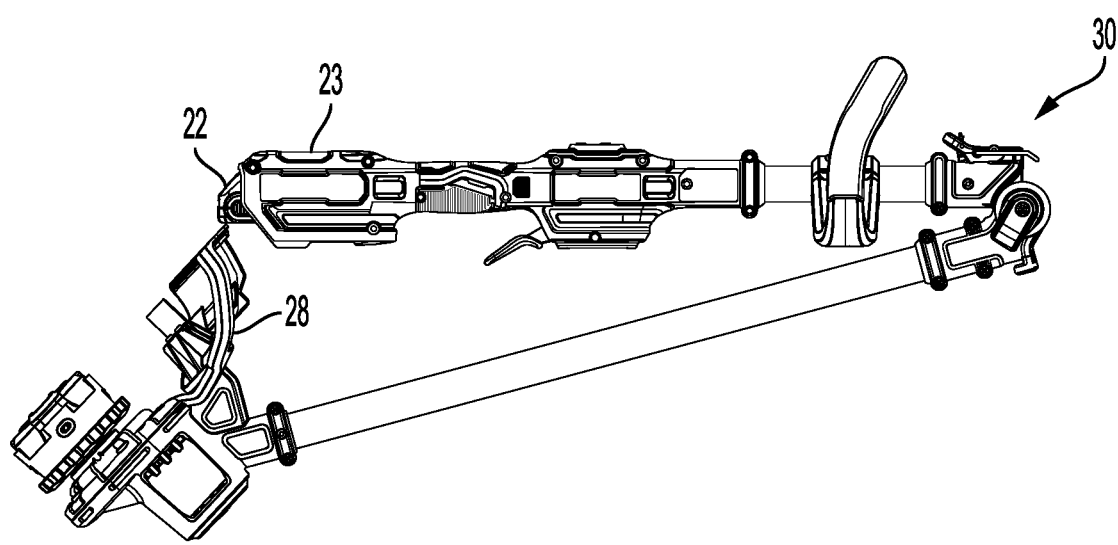
FIG. 3 shows a partially folded string trimmer with a battery.
Figure 4:
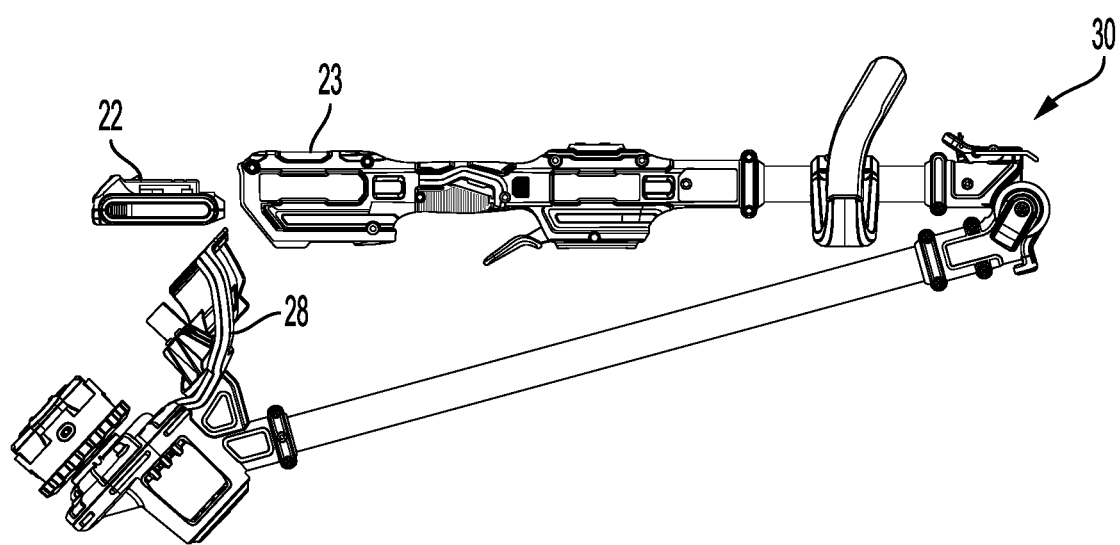
FIG. 4 shows a partially folded string trimmer, with the battery removed.
Figure 5:
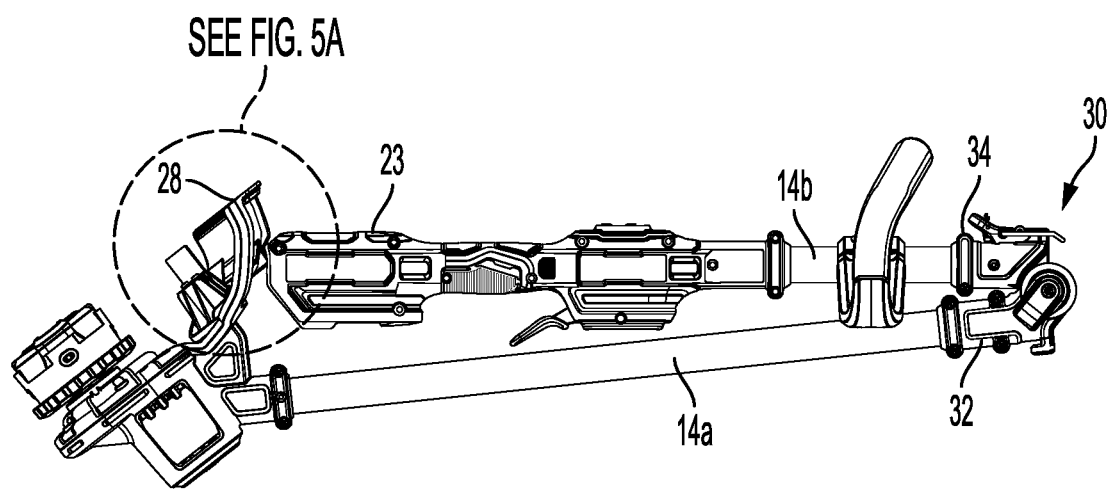
FIG. 5 shows a fully folded string trimmer.

Along a middle section of the pole 14 is a hinge 30. The hinge 30 allows the pole to be folded for easier transportation and storage. FIG. 3 shows the string trimmer partially folded but blocked by the battery 22, FIG. 4 shows the battery 22 removed from the battery housing 23, and FIG. 5 shows the trimmer fully folded.

Referring to FIGS. 5 and 6-9, the hinge 30 is made up of two arms 32 and 34 that are rotatably attached. The arms receive respective pole sections, with the lower pole section 14a inserted into arm 32 and the upper pole section 14b inserted into arm 34.

Figure 6:
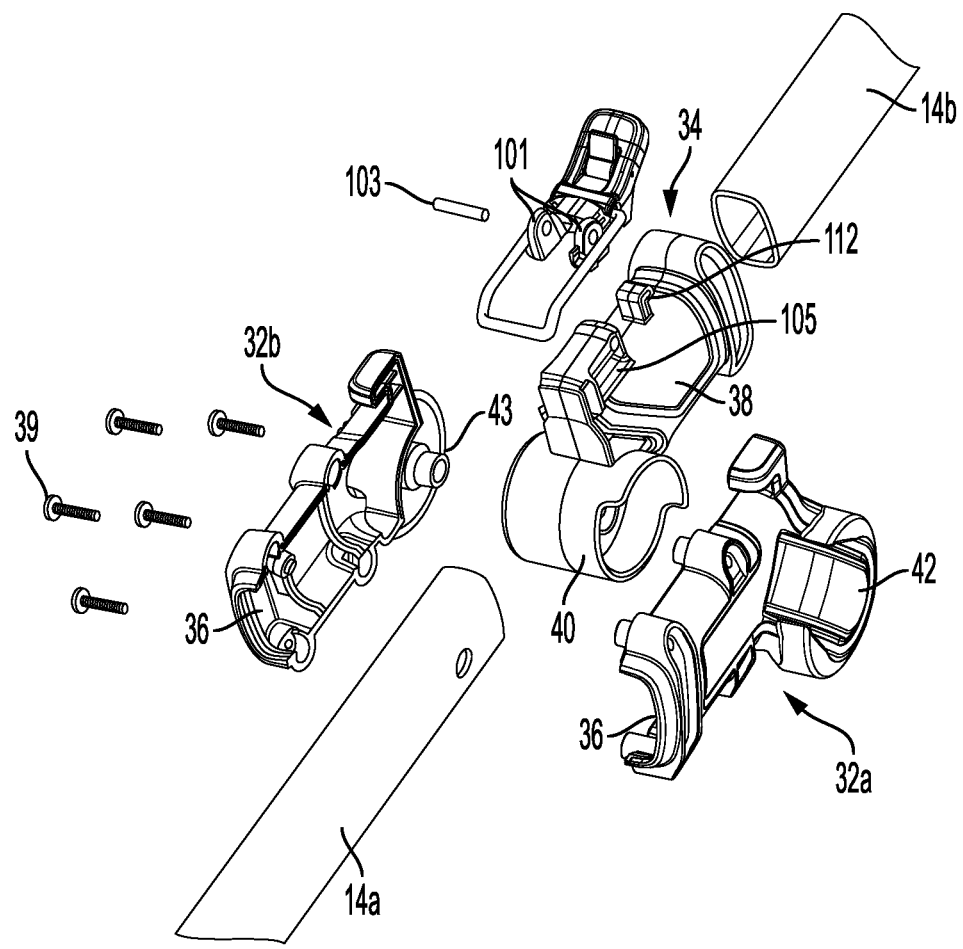
FIG. 6 shows an exploded view of the hinge.

FIG. 6 shows an exploded view of the hinge 30. The arm 34 includes a socket 38 for receiving the pole section 14b, and a hub 40 for rotatable connection with the other arm 32. Arm 32 is formed from two clamshell housings 32a and 32b which together form a socket 36 for receiving the pole 14a. The clamshells are secured through fasteners 39. The clamshells also form an axle housing 42 having an axle 43 that extends through the hub 40, and connects the two arms 32 and 34 together.

Figure 7:
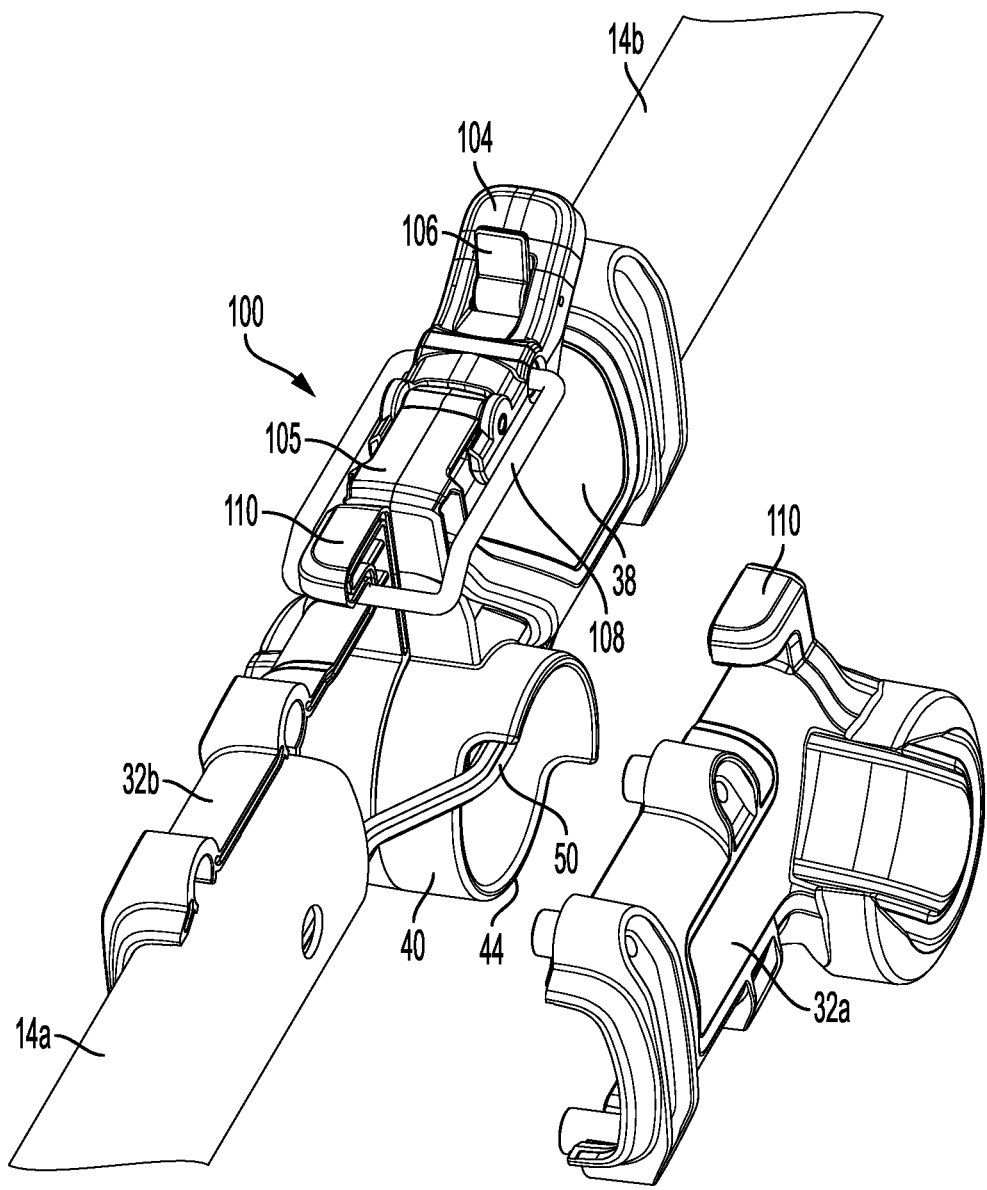
FIG. 7 shows a partially assembled hinge of FIG. 6.
Figure 8:
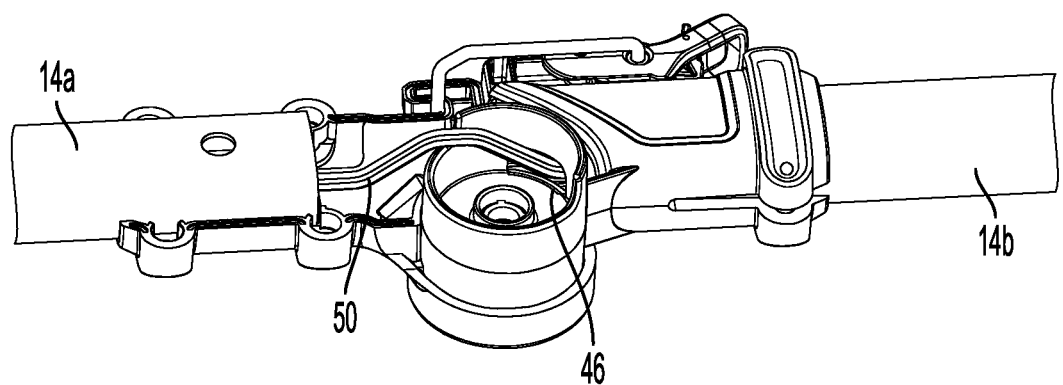
FIG. 8 shows the interior of the hinge in a straight position.
Figure 9:
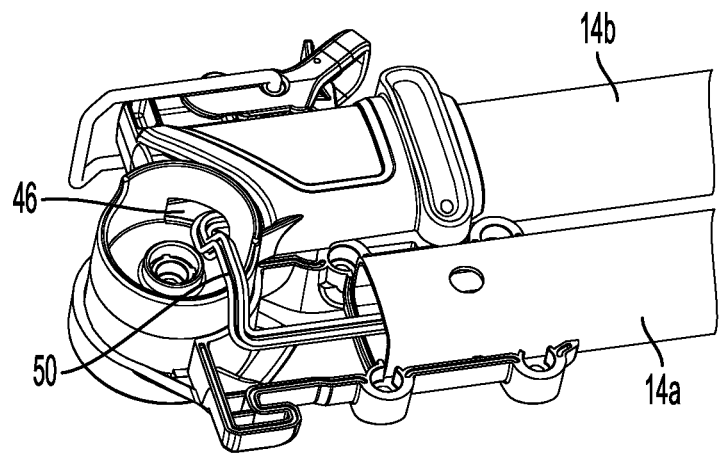
FIG. 9 shows the interior of the hinge in a folded position.

FIG. 7 shows the hinge 30 partially assembled, with the clamshell 32a removed for clarity. As noted earlier, an embodiment of the invention uses a battery 22 to power the string trimmer and an electrical cable 50 runs through the pole 14 from the battery housing 23 to the motor. The cable 50 travels down the pole section 14b and enters the hub 40 through an opening 46 (seen in FIGS. 8 and 9). A portion of the hub 40 is cutout 44 so that the wire 50 can be bent around the hub and back into pole section 14a. When the clamshell 32a is placed over the hub 40 in the fully assembled position, the cutout 44 create a slot between the hub 40 and the clamshell 32a for the cable 50 to move in when the pole is folded.

The hinge design 30 provides for the electrical cable 50 to be covered at all times and so protected from the environment. Furthermore, the hub 40 reduces the likelihood of "pinching" by the pole sections 14a and 14b, and provides for greater reliability during repeated folding and unfolding, thus eliminating the need for special sheathing for the cable.

Referring again to FIGS. 6 and 7, a latch 100 is provided to lock the hinge in a straight configuration. The latch 100 includes a pair of arms 101 that are secured to a receiving block 105 on the socket 38 using a pin 103. The latch 100 includes a lever 104 that is pivotable with respect to the block 105. A U-shaped wire loop 108 is secured to the lever 104 and a tab 106 is pivotably secured in a slot in the lever 104. An L-shaped bracket 110 is located opposite block 105 on arm 32, so that when the arms 32 and 34 are brought together, the bracket 110 abuts the block 105.

Figure 10:
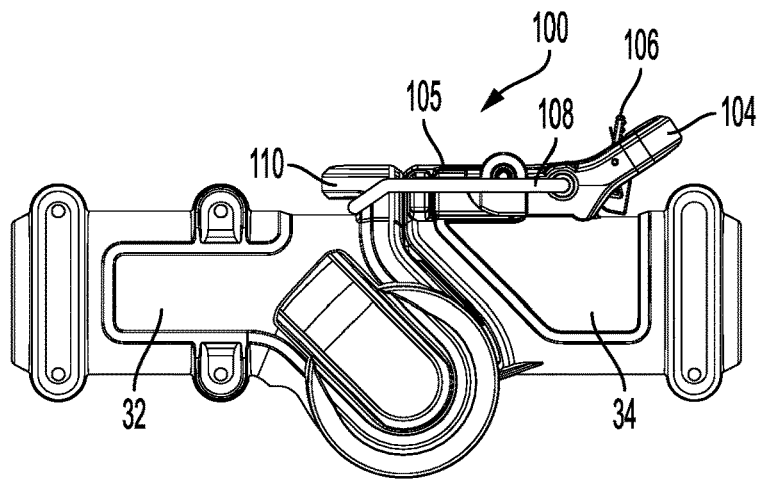
FIGS. 10-14 shows the latch for the hinge at various stages from the locked to unlocked position.
Figure 11:
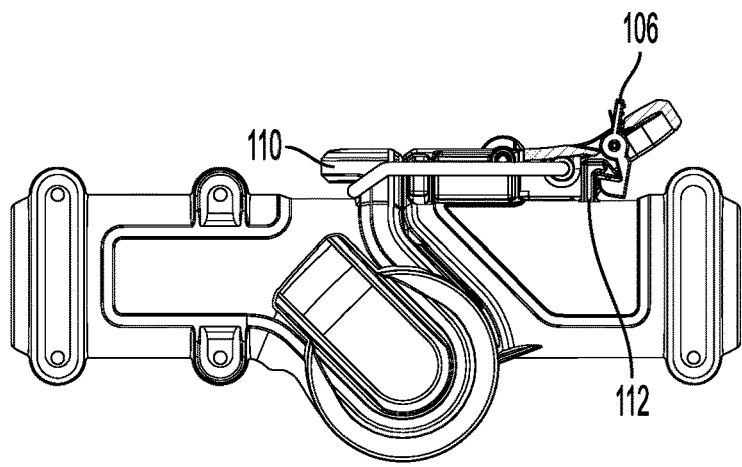
Figure 12:
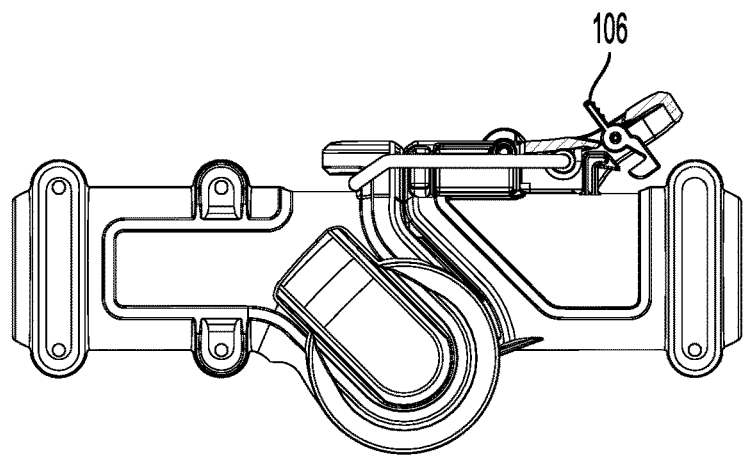
Figure 13:
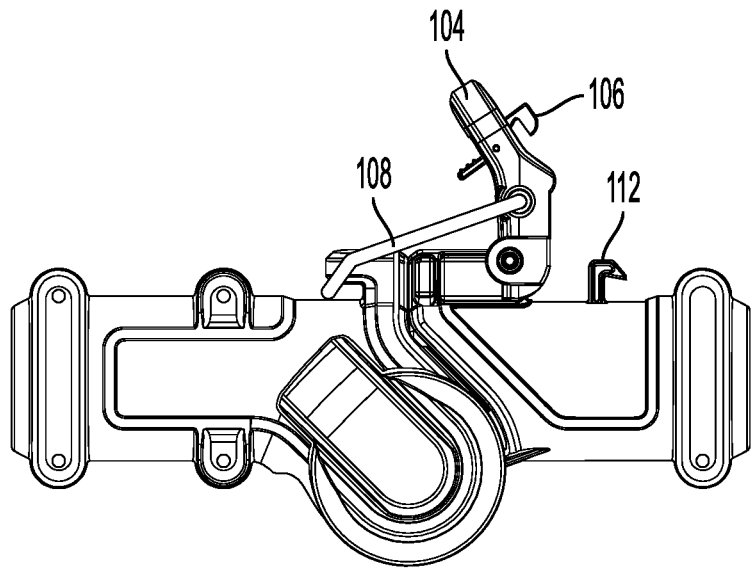
Figure 14:
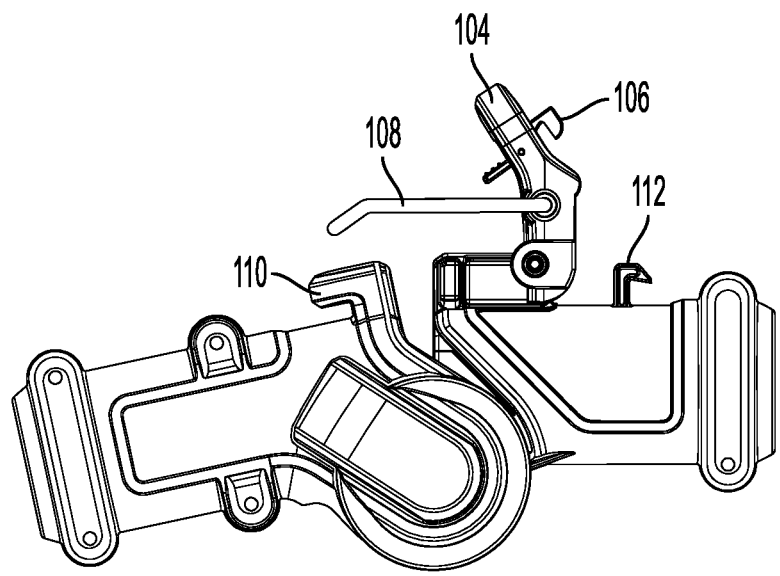

FIGS. 10-14 show the locking and unlocking of the latch 100. FIGS. 10 and 11 show the latch 100 in a locked position, with FIG. 11 showing a partial sectional view showing the tab 106 secured to a hook 112. FIG. 12 then shows the tab 106 pivoted to release it from the hook 112, allowing the lever 104 to be raised. FIG. 13 shows the lever 104 raised, which moves the loop 108 forward so that it releases from the bracket 110, allowing the two arms 32 and 34 to be separated and the pole folded. To lock the poles in the straight position, the process is reversed. The loop 108 is placed around the bracket 110 and the lever 104 is rotated down so that the loop 108 is secured around the bracket 110. The tab 106 is then rotated so that it locks with the hook 112. Although the lever 104 would normally stay in the locked position, the tab 106 provides a backup to prevent accidental release of the lever 104. Although an over-center latch is shown, it should be understood that other locking mechanisms could be used to secure the pole sections together and still fall within the scope of the invention.

Referring back to FIGS. 3-5, a further feature of the invention is shown. FIG. 3 shows a battery 22 inserted into the battery housing 23, and a rearmost part of the battery 22 extending beyond the housing 23 to block the guard 28 and prevent the tool from fully folding. The user would then be alerted to the fact that the battery is still inserted and the string trimmer may be accidently turned on. FIG. 4 shows the battery 22 removed from the battery housing 23, which allows the guard 28 to move past the battery housing 23. And FIG. 5 shows the battery housing 23 secured to the guard 28.

Figure 5A:
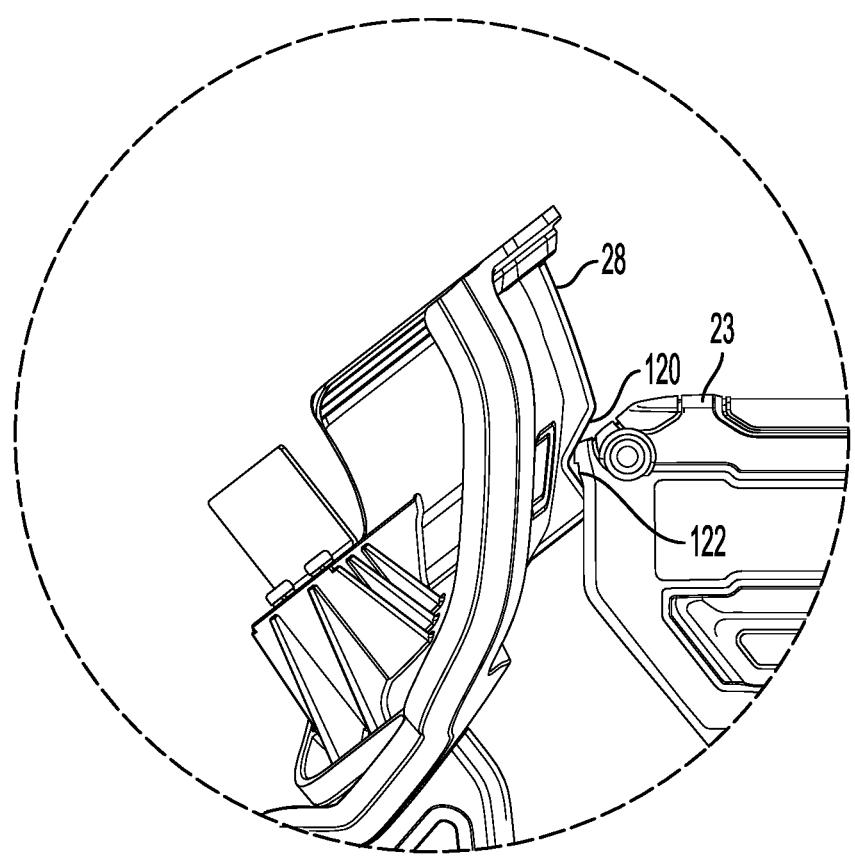
FIG. 5A shows a close up view of a guard and battery housing of FIG. 5.

FIG. 5A shows a closeup of the engagement between the guard 28 and the battery housing 23. The guard 28 includes a retaining feature or cut-out 120 that provides a catch for a lip 122 of the battery receptacle 23. When folding the string trimmer, the lip 122 rides over the edge of the cut-out 120 and comes to rest at its bottommost portion and holds the guard 28 in the folded position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. A string trimmer comprising:
    a pole having a first end with cutting head, the pole having a second end having a handle and a battery housing;
    the pole having a first pole section and a second pole section, the cutting head being on the first pole section and the handle on the second pole section, and wherein the pole is foldable;
    a guard on the cutting head, wherein when a battery is inserted in the battery housing the guard is adapted to contact the battery to prevent the string trimmer from being fully folded.

2. The string trimmer of claim 1, wherein the battery housing only partially encloses the battery so that a portion of the battery is exposed.

3. The string trimmer of claim 1, wherein the cutting head includes a motor housing and a motor, and the guard is secured to the motor housing.

4. The string trimmer of claim 1, wherein the guard includes a retaining feature adapted to secure the battery housing.

5. The string trimmer of claim 4, wherein the retaining feature is a cut-out that frictionally engages the battery housing.

6. A poled cutting device comprising: a pole having a first end and a second end;
    a cutting implement, a motor housing and a motor in the motor housing on the first end of the pole;
    a guard at the first end of the pole;
    a handle and a battery housing on the second end of the pole;
    the pole including a first pole section and a second pole section, and a hinge connecting the first pole section to the second pole section allowing the pole to be folded;
    an electrical cable connecting the battery housing to the motor, the electrical cable being fully contained within the first pole section, second pole section and hinge; and
    wherein the guard includes a retaining feature adapted to secure the battery housing.

7. The poled cutting device of claim 6 wherein the hinge includes an arm for connecting to a first pole section and a hub for connecting to a second pole section, the hub including an opening to allow the electrical cable to pass through.

8. The poled cutting device of claim 7, wherein the hub further includes a cutout to allow the electrical cable to pass around the hub.

9. The poled cutting device of claim 7, further including a housing placed around the hub to enclose the electrical cable.

10. The poled cutting device of claim 7, further including a latch for locking the first pole section to the second pole section in a straight configuration.

11. The poled cutting device of claim 7, wherein the latch is located on one of the first pole section or second pole section, and a bracket is located on the other one of the first pole section or second pole section, the latch being secured to the bracket to the lock the first pole section to the second pole section in a straight configuration.

12. A method of folding a poled cutting device, comprising the steps providing a pole having a first end with cutting head, the pole having a second end having a handle and a battery housing, the pole having a first pole section and a second pole section, the cutting head being on the first pole section and the handle on the second pole section, a guard on the cutting head;

removing a battery from the battery housing;

folding the poled cutting device so that the first pole section lies relatively parallel to the second poled section;

securing the guard to the battery housing to maintain the poled cutting device in the folded position.

13. The method of folding a poled cutting device according to claim 12, wherein the guard includes a retaining feature adapted to secure the battery housing.

14. The method of folding a poled cutting device according to claim 13, wherein if the battery is not removed from the battery housing, the battery contacts the guard and prevents the poled cutting device from moving into the fully folded position.

\* \* \* \* \*